United States Patent
Matsugi

(10) Patent No.: US 7,321,441 B2
(45) Date of Patent: Jan. 22, 2008

(54) PRINTING SYSTEM AND DEVICES USED THEREFOR

(75) Inventor: Hironori Matsugi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 945 days.

(21) Appl. No.: 10/449,692

(22) Filed: Jun. 2, 2003

(65) Prior Publication Data

US 2004/0114177 A1 Jun. 17, 2004

(30) Foreign Application Priority Data

May 31, 2002 (JP) ............................. 2002-159314
May 28, 2003 (JP) ............................. 2003-151529

(51) Int. Cl.
*G06F 3/12* (2006.01)
*G06F 15/00* (2006.01)
*G06K 1/00* (2006.01)

(52) U.S. Cl. .................... 358/1.15; 358/1.14; 705/1; 705/34; 395/114

(58) Field of Classification Search ............. 358/1.15; 705/80

See application file for complete search history.

(56) References Cited

U.S. PATENT DOCUMENTS 6,654,135 B2 * 11/2003 Mitani ..................... 358/1.15
2002/0013774 A1 * 1/2002 Morimoto ................... 705/80
2002/0018229 A1 * 2/2002 Nakamaki et al. ......... 358/1.14
2002/0154335 A1 * 10/2002 Matoba et al. ............ 358/1.15

FOREIGN PATENT DOCUMENTS

| JP | 2000-284935 A | 10/2000 |
| JP | 2001-250008 A | 9/2001 |
| JP | 2002-024515 A | 1/2002 |
| JP | 2002-92439 A | 3/2002 |
| JP | 2002-140309 A | 5/2002 |
| JP | 2002-152705 A | 5/2002 |

* cited by examiner

*Primary Examiner*—Twyler Lamb
*Assistant Examiner*—Hilina S Kassa
(74) *Attorney, Agent, or Firm*—Sughrue Mion, PLLC

(57) ABSTRACT

In a printing management system of the invention, multiple printing devices 50a and 50b are connected via a network 22 with an information management apparatus 30 that manages the whole system, and are divided into plural blocks according to language, currency, and geographical factors. A jurisdiction management server 40 is provided in each of the plural blocks and is connected to the network 22. The information management apparatus 30 receives expendable consumption data regarding an expendable consumed by each of the multiple printing devices 50a and 50b at regular time intervals and transfers the received expendable consumption data to the corresponding jurisdiction management server 40 in the group to which the printing device belongs. The jurisdiction management server 40 manages a supply of the expendable to each of the printing devices 50a and 50b in the block, based on the expendable consumption data, while carrying out accounting to each of the printing devices 50a and 50b with a currency in circulation in the block.

1 Claim, 7 Drawing Sheets

FIG.3

EXPENDABLE CONSUMPTION DATA

| Printing Device ID | JA0050a |
|---|---|
| Jurisdiction Management Server ID | CA0040 |
| Data Acquisition Date | Month, Day, Year |
| Printer ID | P*****1 |
| Printer ID | P*****2 |
| Consumption of Paper (A4/L) | *** |
| Consumption of Paper (A3/L) | *** |
| Consumption of Paper (A4/M) | *** |
| Consumption of Paper (A3/M) | *** |
| Stock of Ink Cartridge (B) | ** |
| Stock of Ink Cartridge (C) | ** |
| Stock of Ink Cartridge (M) | ** |
| Stock of Ink Cartridge (Y) | ** |

FIG.6

Accounting for XX

Printing Device ID    JA0050a

| Item | Quantity | Unit Price ($) | Sub Total ($) |
|---|---|---|---|
| Size A4 (L) | * * * | a1 | * * * * |
| Size A3 (L) | * * * | a2 | * * * * |
| Size A4 (M) | * * * | b1 | * * * * |
| Size A3 (M) | * * * | b2 | * * * * |
|  |  |  |  |
|  | | Total Amount ($) | * * * * * |

| Back | Next | Cancel | Help |

PRINTING SYSTEM AND DEVICES USED THEREFOR

BACKGROUND OF THE INVENTION

1. Field of the Invention

The present invention relates to a printing management system and an information management apparatus and a group management apparatus used for the printing management system, as well as storage media in which programs applied for these apparatuses are stored and corresponding information processing methods.

2. Description of the Prior Art

Known printing management apparatuses include print servers that execute plural print jobs input from multiple computers via a network and image delivery servers that deliver images to each user's computer connected to the Internet and manage printing of the delivered images with the user's computer. Various devices have been proposed to assure the efficient execution of print jobs in the print servers, whereas diverse techniques relating to image delivery and accounting have been proposed in the image delivery servers.

The prior art print servers, however, have not expected the demand for management of print jobs with multiple printing apparatuses located in a wide area, for example, in an area of different languages. The prior art image delivery servers perform accounting for image delivery and printing, but have not expected the demand for management of supplies of expendables consumed in the printing process.

SUMMARY OF THE INVENTION

The object of the present invention is thus to attain effective management of printing with multiple printing devices located in a wide area and effective management of supplies of expendables consumed by the multiple printing devices located in the wide area and to perform adequate accounting to the multiple printing devices located in the wide area, in a printing management system, an information management system and a group management system used for the printing management system, as well as in programs and information processing methods applied for these apparatuses.

In order to achieve at least a part of the aforementioned objects, a printing system and devices used therefore of the present invention are structured as follows.

A first printing management system of the present invention includes multiple printing devices divided into plural groups, plural group management apparatuses, each of which is provided in each of the plural groups and is connected with plural printing devices belonging to the group via a communication line, and an information management apparatus that is connected via the communication line with the multiple printing devices and with the plural group management apparatuses, each of the multiple printing devices including: an information storage module that stores printing device identification information for identifying the printing device, group identification information for identifying a group to which the printing device belongs, and expendable consumption information regarding an expendable consumed by the printing device; and an information transmission module that reads the printing device identification information, the group identification information, and the expendable consumption information from the information storage module at a preset timing and transmits the read-out printing device identification information, group identification information, and expendable consumption information to the information management apparatus via the communication line, the information management apparatus including: an information management apparatus storage module that stores information; an information management apparatus receiver-transmitter module that receives and transmits information via the communication line; an information reception and storage control module that controls the information management apparatus receiver-transmitter module to receive the printing device identification information, the group identification information, and the expendable consumption information transmitted from the information transmission module of each printing device and stores the received printing device identification information, group identification information, and expendable consumption information correlated with one another into the information management apparatus storage module; and an information transmission control module that controls the information management apparatus receiver-transmitter module to transmit the printing device identification information, the group identification information, and the expendable consumption information correlated with one another and stored into the information management apparatus storage module to each group management apparatus identified by the group identification information, each of the group management apparatuses including: a group management apparatus storage module that stores information; a group management apparatus receiver-transmitter module that receives and transmits information via the communication line; an information reception and storage control module that controls the group management apparatus receiver-transmitter module to receive the printing device identification information, the group identification information, and the expendable consumption information transmitted from the information management apparatus receiver-transmitter module and stores the received printing device identification information, group identification information, and expendable consumption information correlated with one another into the group management apparatus storage module; an expendable supplementary quantity setting module that reads the printing device identification information and the expendable consumption information from the group management apparatus storage module and sets a supplementary quantity of the expendable to be supplied to each printing device identified by the printing device identification information based on the read-out expendable consumption information; and an accounting management module that reads the printing device identification information and the expendable consumption information from the group management apparatus storage module, carries out accounting based on the read-out expendable consumption information, and sets a charge to the printing device identified by the printing device identification information.

In the first printing management system of the invention, the information management apparatus receives and stores the printing device identification information, the group identification information, and the expendable consumption information transmitted from each of the multiple printing devices, and transmits the received printing device identification information, group identification information, and expendable consumption information to each group management apparatus identified by the group identification information. The group management apparatus receives and stores the printing device identification information, the group identification information, and the expendable consumption information transmitted from the information management apparatus, and sets a supplementary quantity of the expendable to be supplied to each printing device identified by the printing device identification information, based on the received expendable consumption information. The group management apparatus also carries out accounting based on the received expendable consumption information, and sets a charge to the printing device identified by the printing device identification information. Even in the case where the multiple printing devices are located in a wide area, this arrangement ensures effective management of printing and supplies of the expendable to the multiple printing devices and performs adequate accounting to the multiple printing devices.

A second printing management system of the present invention includes multiple printing devices divided into plural groups, plural group management apparatuses, each of which is provided in each of the plural groups and is connected with plural printing devices belonging to the group via a communication line, and an information management apparatus that is connected via the communication line with the multiple printing devices and with the plural group management apparatuses, each of the multiple printing devices including: an information storage module that stores printing device identification information for identifying the printing device, group identification information for identifying a group to which the printing device belongs, and expendable consumption information regarding an expendable consumed by the printing device; and an information transmission module that reads the printing device identification information, the group identification information, and the expendable consumption information from the information storage module at a preset timing and transmits the read-out printing device identification information, group identification information, and expendable consumption information to the information management apparatus via the communication line, the information management apparatus including: an information management apparatus storage module that stores information; an information management apparatus receiver-transmitter module that receives and transmits information via the communication line; an information reception and storage control module that controls the information management apparatus receiver-transmitter module to receive the printing device identification information, the group identification information, and the expendable consumption information transmitted from the information transmission module of each printing device and stores the received printing device identification information, group identification information, and expendable consumption information correlated with one another into the information management apparatus storage module; and an information transmission control module that reads the printing device identification information, the group identification information, and the expendable consumption information from the information management apparatus storage module, adjusts account information on each printing device identified by the printing device identification information based on the read-out expendable consumption information, and controls the information management apparatus receiver-transmitter module to transmit the adjusted account information, as well as the printing device identification information, the group identification information, and the expendable consumption information to each group management apparatus identified by the group identification information, each of the group management apparatuses including: a group management apparatus storage module that stores information; a group management apparatus receiver-transmitter module that receives and transmits information via the communication line; an information reception and storage control module that controls the group management apparatus receiver-transmitter module to receive the printing device identification information, the group identification information, the expendable consumption information, and the account information transmitted from the information management apparatus receiver-transmitter module and stores the received printing device identification information, group identification information, expendable consumption information, and account information correlated with one another into the group management apparatus storage module; an expendable supplementary quantity setting module that reads the printing device identification information and the expendable consumption information from the group management apparatus storage module and sets a supplementary quantity of the expendable to be supplied to each printing device identified by the printing device identification information based on the read-out expendable consumption information; and an accounting management module that reads the printing device identification information and the account information from the group management apparatus storage module and sets a charge to the printing device identified by the printing device identification information based on the read-out account information.

In the second printing management system of the invention, the information management apparatus receives and stores the printing device identification information, the group identification information, and the expendable consumption information transmitted from each of the multiple printing devices, adjusts account information to each printing device identified by the printing device identification information based on the received expendable consumption information, and transmits the adjusted account information, the printing device identification information, the group identification information, and the expendable consumption information to each group management apparatus identified by the group identification information. The group management apparatus receives and stores the printing device identification information, the group identification information, the expendable consumption information, and the adjusted account information transmitted from the information management apparatus, and sets a supplementary quantity of the expendable to be supplied to the printing device identified by the printing device identification information, based on the received expendable consumption information. The group management apparatus also sets a charge to the printing device identified by the printing device identification information, based on the received account information. Even in the case where the multiple printing devices are located in a wide area, this arrangement ensures effective management of printing and supplies of the expendable to the multiple printing devices and performs adequate accounting to the multiple printing devices. In the second printing management system of the invention, the information management apparatus takes charge of management of accounting to all the printing devices included in the system.

A first information processing method of the present invention is carried out in a printing management system including multiple printing devices divided into plural groups, plural group management apparatuses, each of which is provided in each of the plural groups and is connected with plural printing devices belonging to the group via a communication line, and an information management apparatus that is connected via the communication line with the multiple printing devices and with the plural group management apparatuses, the information processing method includes the steps of: (a) causing each of the printing devices to transmit printing device identification information for identifying the printing device, group identification information for identifying a group to which the printing device belongs, and expendable consumption information regarding an expendable consumed by the printing device, at a preset timing to the information management apparatus via the communication line; (b) causing the information management apparatus to receive and store the printing device identification information, the group identification information, and the expendable consumption information transmitted from the each printing device and to transmit the received printing device identification information, group identification information, and expendable consumption information to each group management apparatus identified by the group identification information; and (c) causing each of the group management apparatuses to receive and store the printing device identification information, the group identification information, and the expendable consumption information transmitted from the information management apparatus, to set a supplementary quantity of the expendable to be supplied to each printing device identified by the printing device identification information based on the received expendable consumption information, and to carry out accounting based on the received expendable consumption information and thereby set a charge to the printing device identified by the printing device identification information.

The first information processing method of the invention carried out in a printing management system causes the information management apparatus to receive and store the printing device identification information, the group identification information, and the expendable consumption information transmitted from each of the multiple printing devices, and to transmit the received printing device identification information, group identification information, and expendable consumption information to each group management apparatus identified by the group identification information. The information processing method causes the group management apparatus to receive and store the printing device identification information, the group identification information, and the expendable consumption information transmitted from the information management apparatus, and to set a supplementary quantity of the expendable to be supplied to each printing device identified by the printing device identification information, based on the received expendable consumption information. The information processing method also causes the group management apparatus to carry out accounting based on the received expendable consumption information and to set a charge to the printing device identified by the printing device identification information. Even in the case where the multiple printing devices are located in a wide area, this arrangement ensures effective management of printing and supplies of the expendable to the multiple printing devices and performs adequate accounting to the multiple printing devices.

A second information processing method of the present invention is carried out in a printing management system including multiple printing devices divided into plural groups, plural group management apparatuses, each of which is provided in each of the plural groups and is connected with plural printing devices belonging to the group via a communication line, and an information management apparatus that is connected via the communication line with the multiple printing devices and with the plural group management apparatuses, the information processing method includes the steps of: (a) causing each of the printing devices to transmit printing device identification information for identifying the printing device, group identification information for identifying a group to which the printing device belongs, and expendable consumption information regarding an expendable consumed by the printing device, at a preset timing to the information management apparatus via the communication line; (b) causing the information management apparatus to receive and store the printing device identification information, the group identification information, and the expendable consumption information transmitted from the each printing device, to adjust account information on each printing device identified by the printing device identification information based on the received expendable consumption information, and to transmit the adjusted account information, the printing device identification information, the group identification information, and the expendable consumption information to each group management apparatus identified by the group identification information; and (c) causing each of the group management apparatuses to receive and store the printing device identification information, the group identification information, the expendable consumption information, and the account information transmitted from the information management apparatus, to set a supplementary quantity of the expendable to be supplied to each printing device identified by the printing device identification information based on the received expendable consumption information, and to set a charge to the printing device identified by the printing device identification information based on the received account information.

The second information processing method of the invention carried out in a printing management system causes the information management apparatus to receive and store the printing device identification information, the group identification information, and the expendable consumption information transmitted from each of the multiple printing devices, to adjust account information to each printing device identified by the printing device identification information based on the received expendable consumption information, and to transmit the adjusted account information, the printing device identification information, the group identification information, and the expendable consumption information to each group management apparatus identified by the group identification information. The information processing method causes the group management apparatus to receive and store the printing device identification information, the group identification information, the expendable consumption information, and the adjusted account information transmitted from the information management apparatus, and to set a supplementary quantity of the expendable to be supplied to the printing device identified by the printing device identification information, based on the received expendable consumption information. The information processing method also causes the group management apparatus to set a charge to the printing device identified by the printing device identification information, based on the received account information. Even in the case where the multiple printing devices are located in a wide area, this arrangement ensures effective management of printing and supplies of the expendable to the multiple printing devices and performs adequate accounting to the multiple printing devices. In the second information processing method of the invention carried out in the printing management system, the information management apparatus takes charge of management of accounting to all the printing devices included in the system.

A first information management apparatus of the present invention is an apparatus that is connected via a communication line with multiple printing devices, which are divided into plural groups, and with plural group management apparatuses, each of which is provided in each of the plural groups and is connected via the communication line with plural printing devices belonging to the group, the information management apparatus including: an information management apparatus storage module that stores information; an information management apparatus receiver-transmitter module that receives and transmits information via the communication line; an information reception and storage control module that controls the information management apparatus receiver-transmitter module to receive printing device identification information for identifying each of the multiple printing devices, group identification information for identifying a group to which the printing device belongs, and expendable consumption information regarding an expendable consumed by the printing device, which are transmitted from the printing device, and stores the received printing device identification information, group identification information, and expendable consumption information correlated with one another into the information management apparatus storage module; and an information transmission control module that controls the information management apparatus receiver-transmitter module to transmit the printing device identification information, the group identification information, and the expendable consumption information correlated with one another and stored into the information management apparatus storage module to each group management apparatus identified by the group identification information.

The first information management apparatus of the invention receives and stores the printing device identification information for identifying each of the multiple printing devices, the group identification information for identifying a group to which the printing device belongs, and the expendable consumption information regarding the expendable consumed by the printing device, which are transmitted from the printing device, and transmits the received printing device identification information, group identification information, and expendable consumption information to each group management apparatus identified by the group identification information. The information management apparatus of this arrangement effectively manages the multiple printing devices and contributes to management by each of the group management apparatus.

A second information management apparatus of the present invention is an apparatus that is connected via a communication line with multiple printing devices, which are divided into plural groups, and with plural group management apparatuses, each of which is provided in each of the plural groups and is connected via the communication line with plural printing devices belonging to the group, the information apparatus including: an information management apparatus storage module that stores group information, which correlates group identification information for identifying each of the plural groups with printing device identification information for identifying each of the multiple printing devices, as one piece of information; an information management apparatus receiver-transmitter module that receives and transmits information via the communication line; an information reception and storage control module that controls the information management apparatus receiver-transmitter module to receive expendable consumption information transmitted from each of the multiple printing devices and stores the received expendable consumption information into the information management apparatus storage module, where the expendable consumption information includes the printing device identification information for identifying the printing device and expendable information regarding an expendable consumed by the printing device; and an information transmission control module that reads the expendable consumption information stored in the information management apparatus storage module and controls the information management apparatus receiver-transmitter module to transmit the read-out expendable consumption information to each group management apparatus provided in each group specified by the printing device identification information included in the expendable consumption information and the group information stored in the information management apparatus storage module.

The second information management apparatus of the invention stores in advance the group information, which correlates the group identification information for identifying each of the plural groups with the printing device identification information for identifying each of the multiple printing devices, and receives and stores the expendable consumption information transmitted from each of the multiple printing devices. The expendable consumption information includes the printing device identification information for identifying the printing device and the expendable information regarding the expendable consumed by the printing device. The second information management apparatus reads the stored expendable consumption information, and transmits the read-out expendable consumption information to each group management apparatus provided in each group specified by the printing device identification information included in the expendable consumption information and the group information stored in advance. The information management apparatus of this arrangement effectively manages the multiple printing devices and contributes to management by each of the group management apparatus.

The first and second information management apparatuses of the present invention may include an account information transmission control module that reads the printing device identification information, the expendable consumption information, and the group identification information from the information management apparatus storage module, adjusts account information on each printing device identified by the printing device identification information based on the read-out expendable consumption information, and controls the information management apparatus receiver-transmitter module to transmit the adjusted account information to the group management apparatus identified by the group identification information. This arrangement enables the information management apparatus to contribute to the accounting by the group management apparatus to each of the plural printing devices belonging to the group and to manage the charges to all the printing devices.

In the first and second information management apparatuses of the present invention, each of the plural groups may be set in each geographical area, or may be set for at least each of different languages. This arrangement ensures management of the printing devices corresponding to each geographical area or each of different languages.

In the first and second information management apparatuses of the present invention, each of the plural groups may further set for at least each of different currencies. This arrangement ensures management of the printing devices corresponding to each of different currencies.

A first storage medium of the present invention is a storage medium in which a program applied for an information management apparatus is stored, the information management apparatus including an information storage module that stores information and a receiver-transmitter module that receives and transmits information via a communication line, the information management apparatus being connected via the communication line with multiple printing devices, which are divided into plural groups, and with plural group management apparatuses, each of which is provided in each of the plural groups and is connected via the communication line with plural printing devices belonging to the group, the program including: a module that controls the receiver-transmitter module to receive printing device identification information for identifying each of the multiple printing devices, group identification information for identifying a group to which the printing device belongs, and expendable consumption information regarding an expendable consumed by the printing device, which are transmitted from the printing device, and stores the received printing device identification information, group identification information, and expendable consumption information correlated with one another into the information storage module; and a module that controls the receiver-transmitter module to transmit the printing device identification information, the group identification information, and the expendable consumption information correlated with one another and stored into the information storage module to each group management apparatus identified by the group identification information.

The program stored in the first storage medium of the invention is executed by the information management apparatus. The program is implemented to receive and store the printing device identification information for identifying each of the multiple printing devices, the group identification information for identifying a group to which the printing device belongs, and the expendable consumption information regarding the expendable consumed by the printing device, which are transmitted from the printing device, and to transmit the received printing device identification information, group identification information, and expendable consumption information to each group management apparatus identified by the group identification information. This arrangement effectively manages the multiple printing devices and contributes to management by each of the group management apparatus.

A second storage medium of the present invention is a storage medium in which a program applied for an information management apparatus is stored, the information management apparatus including an information storage module that stores information and a receiver-transmitter module that receives and transmits information via a communication line, the information management apparatus being connected via the communication line with multiple printing devices, which are divided into plural groups, and with plural group management apparatuses, each of which is provided in each of the plural groups and is connected via the communication line with plural printing devices belonging to the group, the program including: a module that controls the receiver-transmitter module to receive expendable consumption information transmitted from each of the multiple printing devices and stores the received expendable consumption information into the information storage module, where the expendable consumption information includes printing device identification information for identifying the printing device and expendable information regarding an expendable consumed by the printing device; and a module that reads the expendable consumption information stored in the information storage module and controls the receiver-transmitter module to transmit the read-out expendable consumption information to each group management apparatus provided in each group specified by the printing device identification information included in the expendable consumption information and group information stored in the information storage module.

The program stored in the second storage medium of the invention is executed by the information management apparatus. The program is implemented to store in advance the group information, which correlates the group identification information for identifying each of the plural groups with the printing device identification information for identifying each of the multiple printing devices, and receive and store the expendable consumption information transmitted from each of the multiple printing devices. The expendable consumption information includes the printing device identification information for identifying the printing device and the expendable information regarding the expendable consumed by the printing device. The program is further implemented to read the stored expendable consumption information, and transmit the read-out expendable consumption information to each group management apparatus provided in each group specified by the printing device identification information included in the expendable consumption information and the group information stored in advance. This arrangement effectively manages the multiple printing devices and contributes to management by each of the group management apparatus.

A first information processing method of the present invention is applied for an information management apparatus that is connected via a communication line with multiple printing devices, which are divided into plural groups, and with plural group management apparatuses, each of which is provided in each of the plural groups and is connected via the communication line with plural printing devices belonging to the group, the information processing method includes the steps of: (a) receiving and storing printing device identification information for identifying each of the multiple printing devices, group identification information for identifying a group to which the printing device belongs, and expendable consumption information regarding an expendable consumed by the printing device, which are transmitted from the printing device; and (b) transmitting the received printing device identification information, group identification information, and expendable consumption information to each group management apparatus identified by the group identification information.

The first information processing method applied for the information management apparatus of the invention receives and stores the printing device identification information for identifying each of the multiple printing devices, the group identification information for identifying a group to which the printing device belongs, and the expendable consumption information regarding the expendable consumed by the printing device, which are transmitted from the printing device, and transmits the received printing device identification information, group identification information, and expendable consumption information to each group management apparatus identified by the group identification information. Even in the case where the multiple printing devices are located in a wide area, this arrangement ensures effective management of printing and supplies of the expendable to the multiple printing devices and performs adequate accounting to the multiple printing devices.

A second information processing method of the present invention applied for a information management apparatus that is connected via a communication line with multiple printing devices, which are divided into plural groups, and with plural group management apparatuses, each of which is provided in each of the plural groups and is connected via the communication line with plural printing devices belonging to the group, the information processing method includes the steps of: (a) storing in advance group information, which correlates group identification information for identifying each of the plural groups with printing device identification information for identifying each of the multiple printing devices; (b) receiving and storing expendable consumption information transmitted from each of the multiple printing devices, where the expendable consumption information includes the printing device identification information for identifying the printing device and expendable information regarding an expendable consumed by the printing device; and (c) transmitting the received expendable consumption information to each group management apparatus provided in each group specified by the printing device identification information included in the received expendable consumption information and the group information stored in advance.

The second information processing method applied for the information management apparatus of the invention stores in advance the group information, which correlates the group identification information for identifying each of the plural groups with the printing device identification information for identifying each of the multiple printing devices, and receives and stores the expendable consumption information transmitted from each of the multiple printing devices. The expendable consumption information includes the printing device identification information for identifying the printing device and the expendable information regarding the expendable consumed by the printing device. The second information processing method further reads the stored expendable consumption information, and transmits the read-out expendable consumption information to each group management apparatus provided in each group specified by the printing device identification information included in the expendable consumption information and the group information stored in advance. This arrangement effectively manages the multiple printing devices and contributes to management by each of the group management apparatus.

The first and second information processing methods of the present invention may further include the steps of: adjusting account information to each printing device identified by the printing device identification information, based on the received expendable consumption information; and transmitting the adjusted account information to the group management apparatus identified by the group identification information.

A first group management apparatus of the present invention is an apparatus that is connected via a communication line with plural printing devices belonging to a group and with an information management apparatus, the group management apparatus including: a group management apparatus storage module that stores information; a group management apparatus receiver-transmitter module that receives and transmits information via the communication line; an information reception and storage control module that controls the group management apparatus receiver-transmitter module to receive printing device identification information for identifying each of the plural printing devices, group identification information for identifying the group to which the printing device belongs, and expendable consumption information regarding an expendable consumed by the printing device, which are transmitted from the information management apparatus, and stores the received printing device identification information, group identification information, and expendable consumption information correlated with one another into the group management apparatus storage module; an expendable supplementary quantity setting module that reads the printing device identification information and the expendable consumption information from the group management apparatus storage module and sets a supplementary quantity of the expendable to be supplied to each printing device identified by the printing device identification information based on the read-out expendable consumption information; and an accounting management module that reads the printing device identification information and the expendable consumption information from the group management apparatus storage module, carries out accounting based on the read-out expendable consumption information, and sets a charge to the printing device identified by the printing device identification information.

The first group management apparatus of the invention receives and stores the printing device identification information for identifying each of the plural printing devices, the group identification information for identifying the group to which the printing device belongs, and the expendable consumption information regarding an expendable consumed by the printing device, which are transmitted from the information management apparatus. The first group management apparatus sets a supplementary quantity of the expendable to be supplied to each printing device identified by the printing device identification information based on the received expendable consumption information, carries out accounting based on the received expendable consumption information, and sets a charge to the printing device identified by the printing device identification information. This arrangement ensures effective management of supply of the expendable to each of the plural printing devices belonging to the group. The first group management apparatus of the invention carries out accounting to the corresponding printing device, based on the received printing expendable information. This arrangement ensures adequate accounting to each of the plural printing devices belonging to the group.

A second group management apparatus of the present invention is an apparatus that is connected via a communication line with plural printing devices belonging to a group and with an information management apparatus, the group management apparatus including: a group management apparatus storage module that stores information; a group management apparatus receiver-transmitter module that receives and transmits information via the communication line; an information reception and storage control module that controls the group management apparatus receiver-transmitter module to receive printing device identification information for identifying each of the plural printing devices, group identification information for identifying the group to which the printing device belongs, expendable consumption information regarding an expendable consumed by the printing device, and account information on the printing device, which are transmitted from the information management apparatus, and stores the received printing device identification information, group identification information, expendable consumption information, and the account information correlated with one another into the group management apparatus storage module; an expendable supplementary quantity setting module that reads the printing device identification information and the expendable consumption information from the group management apparatus storage module and sets a supplementary quantity of the expendable to be supplied to each printing device identified by the printing device identification information based on the read-out expendable consumption information; and an accounting management module that reads the printing device identification information and the account information from the group management apparatus storage module, and sets a charge to the printing device identified by the printing device identification information based on the read-out account information.

The second group management apparatus of the invention receives and stores the printing device identification information for identifying each of the plural printing devices, the group identification information for identifying the group to which the printing device belongs, the expendable consumption information regarding an expendable consumed by the printing device, and the account information on the printing device, which are transmitted from the information management apparatus. The second group management apparatus sets a supplementary quantity of the expendable to be supplied to each printing device identified by the printing device identification information based on the received expendable consumption information, while setting a charge to the printing device identified by the printing device identification information based on the received account information. This arrangement ensures effective management of supply of the expendable to each of the plural printing devices belonging to the group. The second group management apparatus of the invention receives the account information on each of the plural printing devices belonging to the group, which is transmitted from the information management apparatus, and performs accounting to the corresponding printing device based on the received account information. This arrangement ensures adequate accounting to each of the plural printing devices belonging to the group.

In the first and second group management apparatuses of the invention, the accounting management module may set the charge with a currency in circulation in the group. The first and second group management apparatuses of the invention may include a charge transmission control module that controls the group management apparatus receiver-transmitter module to transmit the charge set by the accounting management module via the communication line to the printing device identified by the printing device identification information. The first and second group management apparatuses of the invention, being connected via the communication line with a computer of an expendable supply organization that supplies the expendable to each of the plural printing devices in the group, the group management apparatuses may further include a supplementary quantity transmission control module that controls the group management apparatus receiver-transmitter module to transmit the supplementary quantity of the expendable set by the expendable supplementary quantity setting module via the communication line to the computer of the expendable supply organization.

A third storage medium of the present invention is a storage medium in which a program applied for a group management apparatus is stored, the group management apparatus including a storage module that stores information and a receiver-transmitter module that receives and transmits information via a communication line, the group management apparatus being connected via the communication line with plural printing devices belonging to a group and with an information management apparatus, the program including: a module that controls the receiver-transmitter module to receive printing device identification information for identifying each of the plural printing devices, group identification information for identifying the group to which the printing device belongs, and expendable consumption information regarding an expendable consumed by the printing device, which are transmitted from the information management apparatus, and stores the received printing device identification information, group identification information, and expendable consumption information correlated with one another into the storage module; a module that reads the printing device identification information and the expendable consumption information from the storage module and sets a supplementary quantity of the expendable to be supplied to each printing device identified by the printing device identification information based on the read-out expendable consumption information; and a module that reads the printing device identification information and the expendable consumption information from the storage module, carries out accounting based on the read-out expendable consumption information, and sets a charge to the printing device identified by the printing device identification information.

The program stored in the third storage medium of the invention is executed by the group management apparatus. The program is implemented to receive and store the printing device identification information for identifying each of the plural printing devices, the group identification information for identifying the group to which the printing device belongs, and the expendable consumption information regarding an expendable consumed by the printing device, which are transmitted from the information management apparatus, to set a supplementary quantity of the expendable to be supplied to each printing device identified by the printing device identification information based on the received expendable consumption information, to carry out accounting based on the received expendable consumption information, and to set a charge to the printing device identified by the printing device identification information. This arrangement ensures effective management of supply of the expendable to each of the plural printing devices belonging to the group. The accounting to the corresponding printing device is performed, based on the received printing expendable information. This arrangement ensures adequate accounting to each of the plural printing devices belonging to the group.

A fourth storage medium of the present invention is a storage medium in which a program applied for a group management apparatus is stored, the group management apparatus including a storage module that stores information and a receiver-transmitter module that receives and transmits information via a communication line, the group management apparatus being connected via the communication line with plural printing devices belonging to a group and with an information management apparatus, the program including: a module that controls the receiver-transmitter module to receive printing device identification information for identifying each of the plural printing devices, group identification information for identifying the group to which the printing device belongs, expendable consumption information regarding an expendable consumed by the printing device, and account information on the printing device, which are transmitted from the information management apparatus, and stores the received printing device identification information, group identification information, expendable consumption information, and account information correlated with one another into the storage module; a module that reads the printing device identification information and the expendable consumption information from the storage module and sets a supplementary quantity of the expendable to be supplied to each printing device identified by the printing device identification information based on the read-out expendable consumption information; and a module that reads the printing device identification information and the account information from the storage module and sets a charge to the printing device identified by the printing device identification information based on the read-out account information.

The program stored in the fourth storage medium of the invention is executed by the group management apparatus. The program is implemented to receive and store the printing device identification information for identifying each of the plural printing devices, the group identification information for identifying the group to which the printing device belongs, the expendable consumption information regarding an expendable consumed by the printing device, and the account information on the printing device, which are transmitted from the information management apparatus, to set a supplementary quantity of the expendable to be supplied to each printing device identified by the printing device identification information based on the received expendable consumption information, and to set a charge to the printing device identified by the printing device identification information based on the received account information. This arrangement ensures effective management of supply of the expendable to each of the plural printing devices belonging to the group. The program is implemented to receive the account information on each of the plural printing devices belonging to the group, which is transmitted from the information management apparatus, and perform accounting to the corresponding printing device based on the received account information. This arrangement ensures adequate accounting to each of the plural printing devices belonging to the group.

A first information processing method of the present invention applied for a group management apparatus, which is connected via a communication line with plural printing devices belonging to a group and with an information management apparatus, the information processing method includes the steps of: (a) receiving and storing printing device identification information for identifying each of the plural printing devices, group identification information for identifying the group to which the printing device belongs, and expendable consumption information regarding an expendable consumed by the printing device, which are transmitted from the information management apparatus; (b) setting a supplementary quantity of the expendable to be supplied to each printing device identified by the printing device identification information based on the received expendable consumption information; and (c) carrying out accounting based on the received expendable consumption information and setting a charge to the printing device identified by the printing device identification information.

The first information processing method of the invention applied for the group management apparatus receives and stores the printing device identification information for identifying each of the plural printing devices, the group identification information for identifying the group to which the printing device belongs, and the expendable consumption information regarding an expendable consumed by the printing device, which are transmitted from the information management apparatus. The information processing method sets a supplementary quantity of the expendable to be supplied to each printing device identified by the printing device identification information, based on the received expendable consumption information. This arrangement ensures effective management of supply of the expendable to each of the plural printing devices belonging to the group. The information processing method of the invention applied for the first group management apparatus also carries out accounting based on the received expendable consumption information, and sets a charge to the printing device identified by the printing device identification information. This arrangement ensures adequate accounting to each of the plural printing devices belonging to the group.

A second information processing method of the present invention applied for the a group management apparatus, which is connected via a communication line with plural printing devices belonging to a group and with an information management apparatus, the information processing method includes the steps of: (a) receiving and storing printing device identification information for identifying each of the plural printing devices, group identification information for identifying the group to which the printing device belongs, and expendable consumption information regarding an expendable consumed by the printing device, which are transmitted from the information management apparatus; (b) setting a supplementary quantity of the expendable to be supplied to each printing device identified by the printing device identification information based on the received expendable consumption information; and (c) setting a charge to the printing device identified by the printing device identification information based on the received account information.

The second information processing method of the invention applied for the group management apparatus receives and stores the printing device identification information for identifying each of the plural printing devices, the group identification information for identifying the group to which the printing device belongs, the expendable consumption information regarding an expendable consumed by the printing device, and the account information on the printing device, which are transmitted from the information management apparatus. The information processing method sets a supplementary quantity of the expendable to be supplied to each printing device identified by the printing device identification information, based on the received expendable consumption information. This arrangement ensures effective management of supply of the expendable to each of the plural printing devices belonging to the group. The information processing method of the invention applied for the second group management apparatus also sets a charge to the printing device identified by the printing device identification information, based on the received account information. This arrangement ensures adequate accounting to each of the plural printing devices belonging to the group.

A third printing management system of the present invention includes multiple printing devices divided into plural groups, plural group management apparatuses, each of which is provided in each of the plural groups and is connected with plural printing devices belonging to the group via a communication line, and an information management apparatus that is connected via the communication line with the multiple printing devices and with the plural group management apparatuses, the information management apparatus receiving, from each of the multiple printing devices, printing expendable information, which regards printing by the printing device and an expendable consumed in the printing process, and transmitting the received printing expendable information to a corresponding group management apparatus to which the printing device belongs, the group management apparatus setting and outputting a supplementary quantity of the expendable to be supplied to each of the multiple printing devices based on the received printing expendable information and carrying out accounting to the corresponding printing device based on the received printing expendable information.

In the third printing management system of the invention, the information management apparatus receives, from each of the multiple printing devices, printing expendable information, which regards printing by the printing device and an expendable consumed in the printing process, and transmits the received printing expendable information to a corresponding group management apparatus to which the printing device belongs. The group management apparatus sets and outputs a supplementary quantity of the expendable to be supplied to each of the multiple printing devices based on the received printing expendable information and carries out accounting to the corresponding printing device based on the received printing expendable information. Even in the case where the multiple printing devices are located in a wide area, this arrangement ensures effective management of printing and supplies of the expendable to the multiple printing devices and performs adequate accounting to the multiple printing devices.

A fourth printing management system of the present invention includes multiple printing devices divided into plural groups, plural group management apparatuses, each of which is provided in each of the plural groups and is connected with plural printing devices belonging to the group via a communication line, and an information management apparatus that is connected via the communication line with the multiple printing devices and with the plural group management apparatuses, the information management apparatus receiving, from each of the multiple printing devices, printing expendable information, which regards printing by the printing device and an expendable consumed in the printing process, and transmitting the received printing expendable information to a corresponding group management apparatus to which the printing device belongs, the information management apparatus also adjusting account information regarding each of the multiple printing devices based on the printing expendable information and transmitting the adjusted account information to a corresponding group management apparatus to which the printing device belongs, the group management apparatus setting and outputting a supplementary quantity of the expendable to be supplied to each of the multiple printing devices based on the received printing expendable information and carrying out accounting to the corresponding printing device based on the received account information.

In the fourth printing management system of the invention, the information management apparatus receives, from each of the multiple printing devices, printing expendable information, which regards printing by the printing device and an expendable consumed in the printing process, and transmits the received printing expendable information to a corresponding group management apparatus to which the printing device belongs. The information management apparatus also adjusts account information regarding each of the multiple printing devices based on the printing expendable information and transmits the adjusted account information to a corresponding group management apparatus to which the printing device belongs. The group management apparatus sets and outputs a supplementary quantity of the expendable to be supplied to each of the multiple printing devices based on the received printing expendable information and carries out accounting to the corresponding printing device based on the received account information. Even in the case where the multiple printing devices are located in a wide area, this arrangement ensures effective management of printing and supplies of the expendable to the multiple printing devices and performs adequate accounting to the multiple printing devices. In the fourth printing management system of the invention, the information management apparatus effectively manages accounting to all the printing devices.

A third information processing method of the present invention carried out in a printing management system including multiple printing devices divided into plural groups, plural group management apparatuses, each of which is provided in each of the plural groups and is connected with plural printing devices belonging to the group via a communication line, and an information management apparatus that is connected via the communication line with the multiple printing devices and with the plural group management apparatuses, the information processing method includes the steps of: (a) causing the information management apparatus to receive, from each of the multiple printing devices, printing expendable information, which regards printing by the printing device and an expendable consumed in the printing process, and to transmit the received printing expendable information to a corresponding group management apparatus to which the printing device belongs; and (b) causing the group management apparatus to set and output a supplementary quantity of the expendable to be supplied to each of the multiple printing devices based on the received printing expendable information, and to carry out accounting to the corresponding printing device based on the received printing expendable information.

The third information processing method of the invention carried out in the printing management system causes the information management apparatus to receive, from each of the multiple printing devices, printing expendable information, which regards printing by the printing device and an expendable consumed in the printing process, transmit the received printing expendable information to a corresponding group management apparatus to which the printing device belongs. The information processing method of the invention also causes the group management apparatus to set and output a supplementary quantity of the expendable to be supplied to each of the multiple printing devices based on the received printing expendable information and to carry out accounting to the corresponding printing device based on the received printing expendable information. Even in the case where the multiple printing devices are located in a wide area, this arrangement ensures effective management of printing and supplies of the expendable to the multiple printing devices and performs adequate accounting to the multiple printing devices.

A fourth information processing method of the invention carried out in a printing management system including multiple printing devices divided into plural groups, plural group management apparatuses, each of which is provided in each of the plural groups and is connected with plural printing devices belonging to the group via a communication line, and an information management apparatus that is connected via the communication line with the multiple printing devices and with the plural group management apparatuses, the information processing method includes the steps of: (a) causing the information management apparatus to receive, from each of the multiple printing devices, printing expendable information, which regards printing by the printing device and an expendable consumed in the printing process and transmit the received printing expendable information to a corresponding group management apparatus to which the printing device belongs, and to adjust account information regarding each of the multiple printing devices based on the printing expendable information and transmit the adjusted account information to a corresponding group management apparatus to which the printing device belongs, and (b) causing the group management apparatus to set and output a supplementary quantity of the expendable to be supplied to each of the multiple printing devices based on the received printing expendable information, and to carry out accounting to the corresponding printing device based on the received account information.

The fourth information processing method of the invention carried out in the fourth printing management system causes the information management apparatus to receive, from each of the multiple printing devices, printing expendable information, which regards printing by the printing device and an expendable consumed in the printing process, and to transmit the received printing expendable information to a corresponding group management apparatus to which the printing device belongs. The information processing method also causes the information management apparatus to adjust account information regarding each of the multiple printing devices based on the printing expendable information and to transmit the adjusted account information to a corresponding group management apparatus to which the printing device belongs. The information processing method causes the group management apparatus to set and output a supplementary quantity of the expendable to be supplied to each of the multiple printing devices based on the received printing expendable information and to carry out accounting to the corresponding printing device based on the received account information. Even in the case where the multiple printing devices are located in a wide area, this arrangement ensures effective management of printing and supplies of the expendable to the multiple printing devices and performs adequate accounting to the multiple printing devices. In the fourth printing management method of the invention, the information management apparatus effectively manages accounting to all the printing devices.

A third information management apparatus of the present invention is an apparatus that is connected via a communication line with multiple printing devices, which are divided into plural groups, and with plural group management apparatuses, each of which is provided in each of the plural groups and is connected via the communication line with plural printing devices belonging to the group, the information management apparatus including: a printing expendable information reception module that receives, from each of the multiple printing devices, printing expendable information, which regards printing by the printing device and an expendable consumed in the printing process; and a printing expendable information transmission module that transmits the received printing expendable information to a corresponding group management apparatus to which the printing device belongs.

The third information management apparatus of the invention receives, from each of the multiple printing devices, printing expendable information, which regards printing by the printing device and an expendable consumed in the printing process, and transmits the received printing expendable information to a corresponding group management apparatus to which the printing device belongs. The information management apparatus of this arrangement effectively manages the multiple printing devices and contributes to management by each of the group management apparatus.

A third information processing method of the present invention applied for an information management apparatus that is connected via a communication line with multiple printing devices, which are divided into plural groups, and with plural group management apparatuses, each of which is provided in each of the plural groups and is connected via the communication line with plural printing devices belonging to the group, the information processing method includes the steps of: (a) receiving, from each of the multiple printing devices, printing expendable information, which regards printing by the printing device and an expendable consumed in the printing process; and (b) transmitting the received printing expendable information to a corresponding group management apparatus to which the printing device belongs.

The third information processing method of the invention applied for the information management apparatus receives, from each of the multiple printing devices, printing expendable information, which regards printing by the printing device and an expendable consumed in the printing process, and transmits the received printing expendable information to a corresponding group management apparatus to which the printing device belongs. Even in the case where the multiple printing devices are located in a wide area, this arrangement ensures effective management of printing and supplies of the expendable to the multiple printing devices and performs adequate accounting to the multiple printing devices.

A third group management apparatus of the present invention is an apparatus that is connected via a communication line with plural printing devices belonging to a group and with an information management apparatus, the group management apparatus including: a printing expendable information reception module that receives printing expendable information on printing by each of the plural printing devices belonging to the group and on an expendable consumed in the printing process, which is transmitted from the information management apparatus; a supplementary quantity setting module that sets a supplementary quantity of the expendable to be supplied to each of the plural printing devices, based on the received printing expendable information; and an accounting module that carries out accounting to each of the plural printing devices, based on the received printing expendable information.

The third group management apparatus of the invention receives the printing expendable information on printing by each of the plural printing devices belonging to the group and on the expendable consumed in the printing process, which is transmitted from the information management apparatus, and sets a supplementary quantity of the expendable to be supplied to each of the plural printing devices, based on the received printing expendable information. This arrangement ensures effective management of supply of the expendable to each of the plural printing devices belonging to the group. The third group management apparatus of the invention also carries out accounting to each of the plural printing devices, based on the received printing expendable information. This arrangement ensures adequate accounting to each of the plural printing devices belonging to the group.

A fourth group management apparatus of the present invention is an apparatus that is connected via a communication line with plural printing devices belonging to a group and with an information management apparatus, the group management apparatus including: a printing expendable information reception module that receives printing expendable information on printing by each of the plural printing devices belonging to the group and on an expendable consumed in the printing process, which is transmitted from the information management apparatus; a supplementary quantity setting module that sets a supplementary quantity of the expendable to be supplied to each of the plural printing devices, based on the received printing expendable information; an account information reception module that receives account information on each of the plural printing devices belonging to the group, which is transmitted from the information management apparatus; and an accounting module that carries out accounting to each of the plural printing devices, based on the received account information.

The fourth group management apparatus of the invention receives the printing expendable information on printing by each of the plural printing devices belonging to the group and on the expendable consumed in the printing process, which is transmitted from the information management apparatus, and sets a supplementary quantity of the expendable to be supplied to each of the plural printing devices, based on the received printing expendable information. This arrangement ensures effective management of supply of the expendable to each of the plural printing devices belonging to the group. The fourth group management apparatus of the invention receives the account information on each of the plural printing devices belonging to the group, which is transmitted from the information management apparatus, and carries out accounting to each of the plural printing devices, based on the received account information. This arrangement ensures adequate accounting to each of the plural printing devices belonging to the group.

A third information processing method of the present invention applied for a group management apparatus that is connected via a communication line with plural printing devices belonging to a group and with an information management apparatus, the information processing method includes the steps of: (a) receiving printing expendable information on printing by each of the plural printing devices belonging to the group and on an expendable consumed in the printing process, which is transmitted from the information management apparatus; (b) setting a supplementary quantity of the expendable to be supplied to each of the plural printing devices, based on the received printing expendable information; and (c) carrying out accounting to each of the plural printing devices, based on the received printing expendable information.

The third information processing method of the invention applied for the group management apparatus receives the printing expendable information on printing by each of the plural printing devices belonging to the group and on the expendable consumed in the printing process, which is transmitted from the information management apparatus, and sets and outputs a supplementary quantity of the expendable to be supplied to each of the plural printing devices, based on the received printing expendable information. This arrangement ensures effective management of supply of the expendable to each of the plural printing devices belonging to the group. The third information processing method of the invention applied for the group management apparatus also carries out accounting to each of the plural printing devices, based on the received printing expendable information. This arrangement ensures adequate accounting to each of the plural printing devices belonging to the group.

A fourth information processing method of the present invention applied for a group management apparatus that is connected via a communication line with plural printing devices belonging to a group and with an information management apparatus, the information processing method includes the steps of: (a) receiving printing expendable information on printing by each of the plural printing devices belonging to the group and on an expendable consumed in the printing process, which is transmitted from the information management apparatus; (b) setting and outputting a supplementary quantity of the expendable to be supplied to each of the plural printing devices, based on the received printing expendable information; (c) receiving account information on each of the plural printing devices belonging to the group, which is transmitted from the information management apparatus; and (d) carrying out accounting to each of the plural printing devices, based on the received account information.

The fourth information processing method of the invention applied for a group management apparatus receives the printing expendable information on printing by each of the plural printing devices belonging to the group and on the expendable consumed in the printing process, which is transmitted from the information management apparatus, and sets and outputs a supplementary quantity of the expendable to be supplied to each of the plural printing devices, based on the received printing expendable information. This arrangement ensures effective management of supply of the expendable to each of the plural printing devices belonging to the group. The fourth information processing method of the invention applied for a group management apparatus receives the account information on each of the plural printing devices belonging to the group, which is transmitted from the information management apparatus, and carries out accounting to each of the plural printing devices, based on the received account information. This arrangement ensures adequate accounting to each of the plural printing devices belonging to the group.

BRIEF DESCRIPTION OF THE DRAWINGS

FIG. 3 shows one example of expendable consumption data;

FIG. 6 shows one example of accounting notice window; and

DESCRIPTION OF THE PREFERRED EMBODIMENTS

Figure 1:
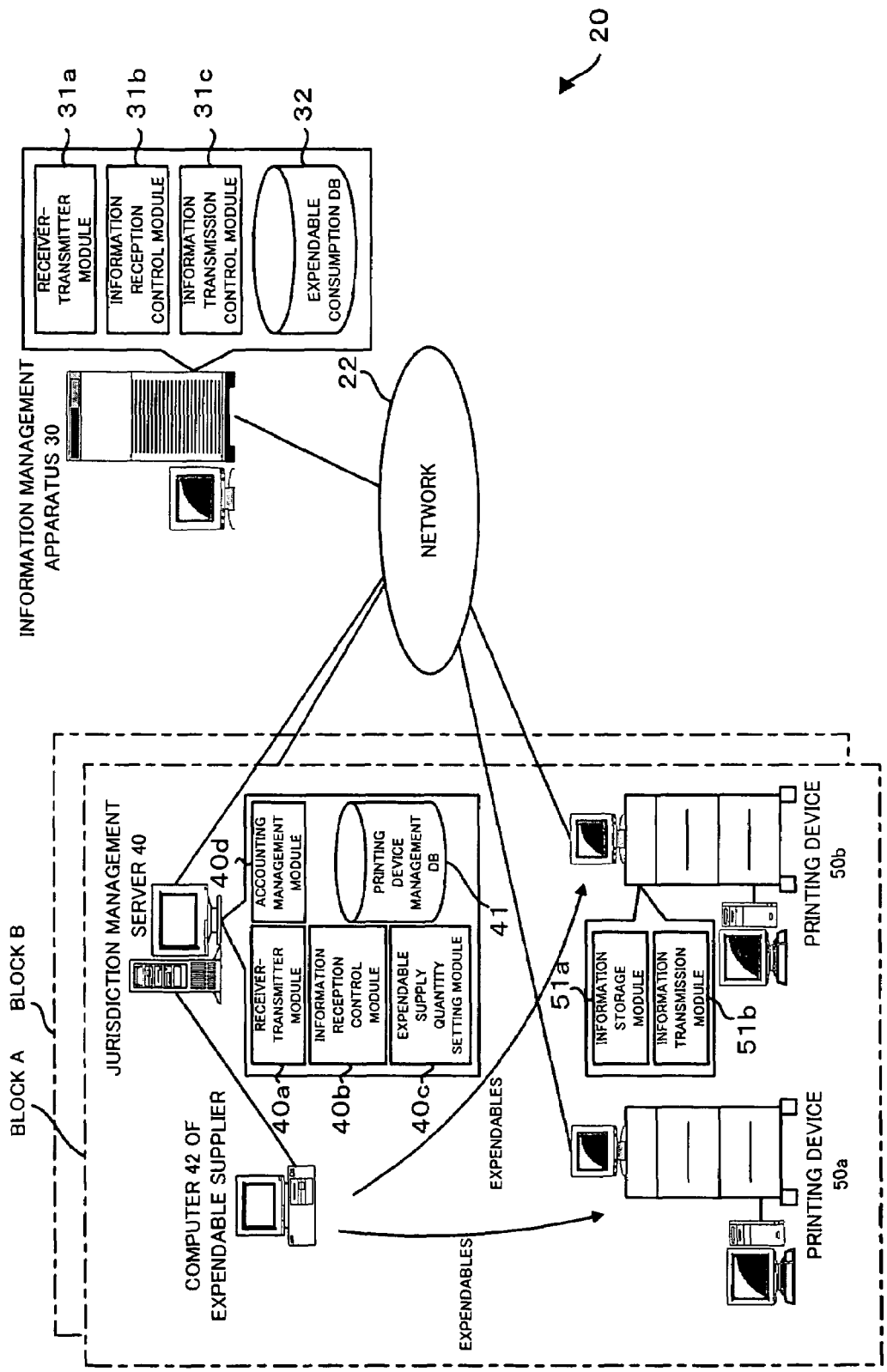
FIG. 1 schematically illustrates the structure of a printing management system 20 in one embodiment of the invention.

A preferred embodiment of the present invention is discussed below. FIG. 1 schematically illustrates the structure of a printing management system 20 in one embodiment of the invention. The printing management system 20 of this embodiment includes an information management apparatus 30, multiple printing devices 50*a* and 50*b* divided into plural blocks according to the language, the geography, and the currency, and a jurisdiction management server 40 that manages supplies of expendables to the multiple printing devices 50*a* and 50*b* in each block. These constituents are mutually connected via a network 22 (for example, the Internet).

The information management apparatus 30 is constructed by a single or multiple computers to function as a network server. The information management apparatus 30 includes a receiver-transmitter module 31a that receives and transmits information via the network, an information reception control module 31b that controls the receiver-transmitter module 31a to receive data regarding a consumption of each expendable consumed in the printing process (hereafter referred to as expendable consumption data) from the multiple printing devices 50a and 50b via the network 22 and stores the received expendable consumption data into an expendable consumption database 32, and an information transmission control module 31c that transmits the expendable consumption data stored in the expendable consumption database 32 to the corresponding jurisdiction management server 40.

The jurisdiction management server 40 functions as a management server to manage supplies of expendables to the printing devices 50 and 50b located at photo studios in each block (a block A or a block B in the illustrated example) and to manage accounting to the respective printing devices 50a and 50b. The jurisdiction management server 40 includes a receiver-transmitter module 40a that receives and transmits information via the network, and an information reception control module 40b that receives the expendable consumption data, which regard consumptions of expendables by the printing devices 50a and 50b in the corresponding block and are transmitted from the information management apparatus 30, and stores the received expendable consumption data as printing device management data into a printing device management database 41. The jurisdiction management server 40 further includes an expendable supply management module 40c that sets supplied quantities of expendables, such as printing papers and printing inks, according to the consumptions of the expendables by the multiple printing devices 50a and 50b at the respective photo studios based on the printing device management data and gives a supply instruction to a computer 42 of an expendable supplier that actually supplies expendables, and an accounting management module 40d that adjusts account information to the respective printing devices 50a and 50b with a currency in circulation in the block based on the printing device management data and notifies the respective printing devices 50a and 50b of the adjusted account information. Like the information management apparatus 30, the jurisdiction management server 40 may be constructed by a single or multiple computers.

Each of the printing devices 50a and 50b includes multiple ink jet printers that is capable of high-performance photographic printing and settles a schedule to specify a printer used for each print job transmitted from a computer connected via a LAN. Each of the printing devices 50a and 50b includes an information storage module 51a that stores a printing device ID utilized for identification of the printing d vice, a jurisdiction management server ID utilized for identification of the jurisdiction management server having jurisdiction over the printing device, and the expendable consumption data including a consumption of each expendable consumed for printing. The printing device 50a or 50b also has an information transmission module 51a that transmits the expendable consumption data, together with the printing device ID and the jurisdiction management server ID, to the information management apparatus 30 at preset time intervals (for example, at every 24 hours), in response to a request from the information management apparatus 30 or in response to a request from each of the printing devices 50a and 50b.

Figure 2:
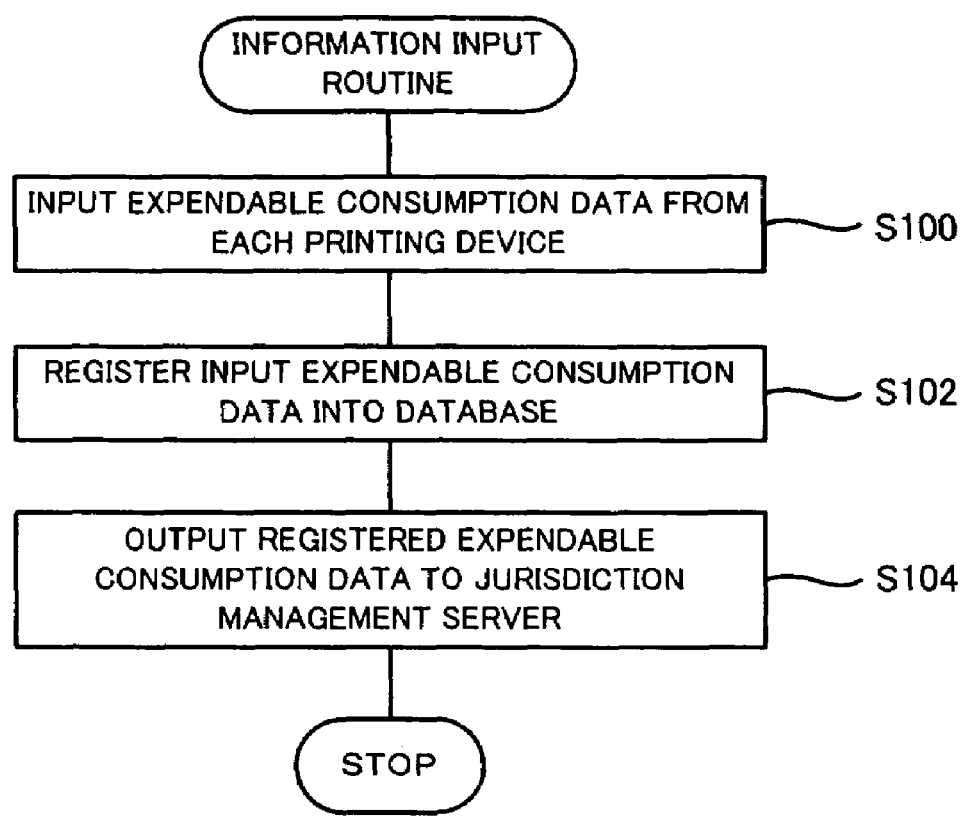
FIG. 2 is a flowchart showing an information input routine executed by an information management apparatus 30.

The printing management system 20 of the embodiment thus constructed carry out series of processing discussed below. FIG. 2 is a flowchart showing an information input routine executed by the information management apparatus 30. This information input routine is carried out iteratively at preset time intervals (for example, at every 24 hours). When the program enters the information input routine, the information management apparatus 30 first inputs the expendable consumption data from all the printing devices 50a and 50b in all the blocks connecting with the information management apparatus 30 via the network 22 (step S100). FIG. 3 shows one example of the expendable consumption data. In this embodiment, the expendable consumption data includes an ID of the corresponding printing device, an ID of the corresponding jurisdiction management server, a data acquisition date when the data has been input from the printing device, IDs of printers incorporated in the printing device, consumptions of respective printing papers, and stocks of ink cartridges of respective colors used for printing.

After reading the expendable consumption data, the information management apparatus 30 registers the input expendable consumption data into the expendable consumption database 32 (step S102) and outputs the registered expendable consumption data to the jurisdiction management server 40 having an allocated ID identical with the input jurisdiction management server ID (step S104). The program then exits from this information input routine. The jurisdiction management server 40 receives the expendable consumption data from the information management apparatus 30 and registers the received expendable consumption data into the printing device management database 41 as the printing device management data used for managing the printing devices 50a and 50b in the block.

Figure 4:
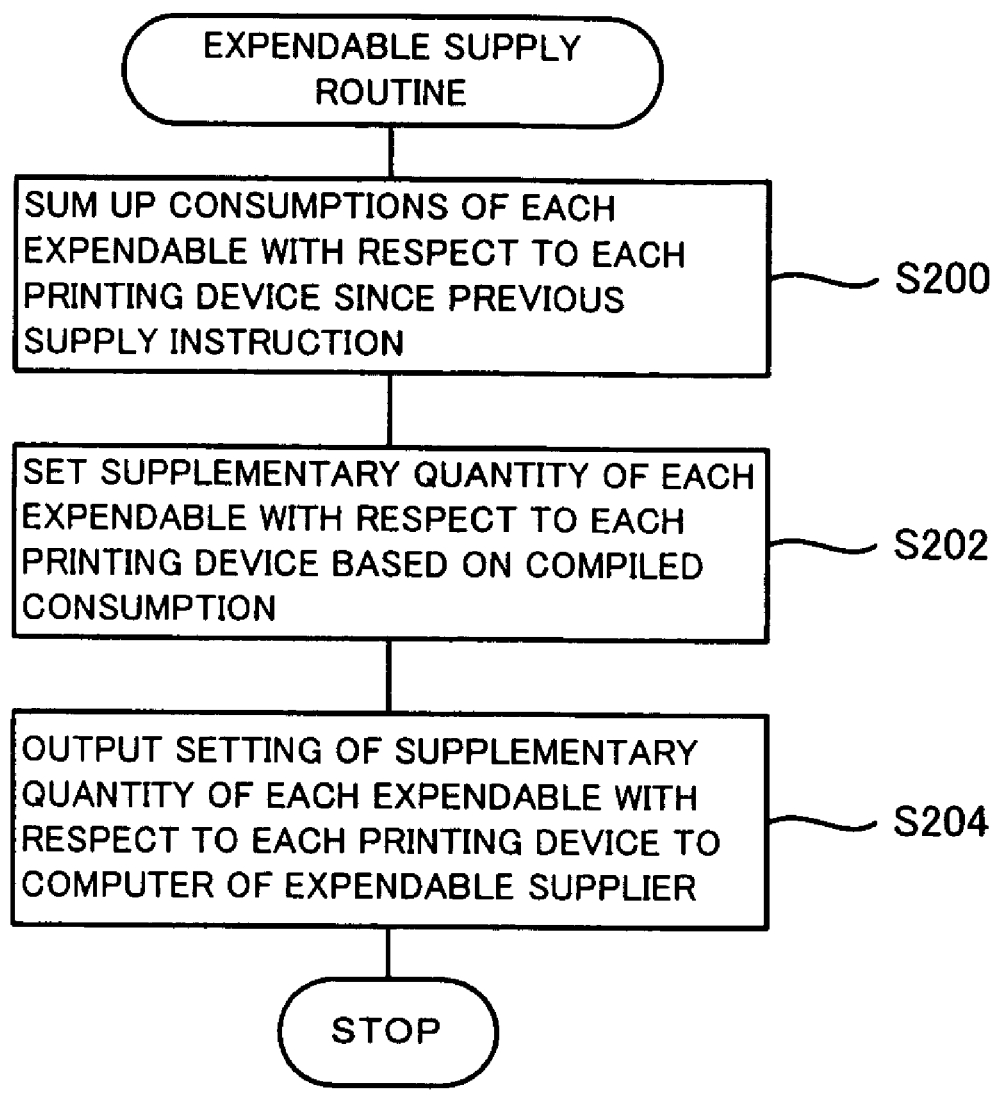
FIG. 4 is a flowchart showing an expendable supply routine executed by a jurisdiction management server 40.
Figure 5:
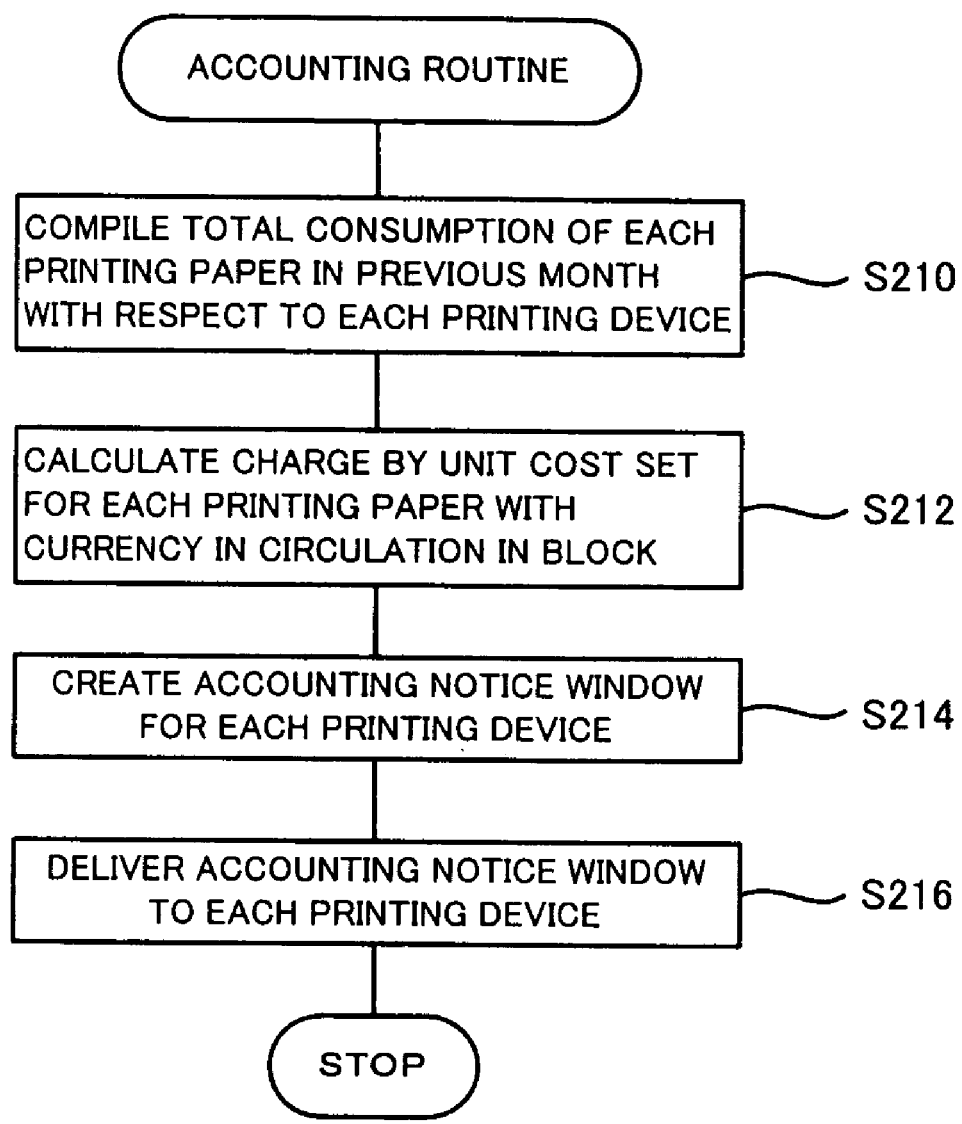
FIG. 5 is a flowchart showing an accounting routine executed by the jurisdiction management server 40.

The following describes series of processing executed by the jurisdiction management server 40 in each block. The jurisdiction management server 40 in each block carries out an expendable supply routine to each of the printing devices 50a and 50b and an accounting routine to each of the printing devices 50a and 50b. FIG. 4 is a flowchart showing an expendable supply routine executed by the jurisdiction management server 40, and FIG. 5 is a flowchart showing an accounting routine executed by the jurisdiction management server 40. The description first regards the expendable supply routine and then the accounting routine.

The expendable supply routine is carried out repeatedly at preset time intervals (for example, at every 24 hours) by the jurisdiction management server 40 in each block. When the program enters the expendable supply routine, the jurisdiction management server 40 first sums up consumptions of each expendable with respect to each printing device since a previous output of the supply instruction (step S200). A concrete procedure to compile the total consumption of each expendable sums up the consumptions of each printing paper specified by each combination of paper size and paper type, while calculating a difference between a preset target stock and a current stock as a consumption of each color of the ink cartridge. The jurisdiction management server 40 then sets a supplementary quantity of each expendable with respect to each printing device, based on the total consumption of the expendable (step S202). The supplementary quantity of each expendable is specified by feed units that are greater than but closest to the actual consumption of the expendable, in the case where the total consumption of each expendable exceeds a minimum stock setting of the expendable. For example, it is assumed that the compiled total consumption of size A4 matt paper (A4/M) is 412 sheets, while the minimum stock setting of the size A4 matt paper (A4/M) is 300 sheets and the feed unit is 100 sheets. In this case, 500 sheets, which correspond to the feed units greater than but closest to the actual consumption of 412 sheets, are set as the supplementary quantity of the size A4 matt paper (A4/M). The actual consumption of each expendable may alternatively be set as the supplementary quantity of the expendable. The setting of the supplementary quantity of each expendable with respect to each printing device is output as a supply instruction of the expendable to the computer 42 of the expendable supplier (step S204). The program then exits from this expendable supply routine. The expendable supplier receives and accepts the supply instruction representing the setting of the supplementary quantity of each expendable with respect to each printing device and gives the accepted supplementary quantity of the expendable to the photo studio at which each printing device is located.

The accounting routine shown in FIG. 5 is executed once a month at a preset time on a preset day (for example, at 10 am on the $1^{st}$ day of every month) by the jurisdiction management server 40 in each block. When the program enters the accounting routine, the jurisdiction management server 40 first searches the printing device management database 41 to compile the total consumption of each printing paper in a previous month with respect to each printing device (step S210), and multiplies the compiled total consumption of each printing paper by a unit cost set for the printing paper with a currency in circulation in the block to calculate a charge for the printing paper (step S212). For example, when the compiled total consumption of the size A4 matt paper (A4/M) in the previous month is 'a' sheets and the unit cost of the size A4 matt paper (A4/M) in the block is 'b' dollars, the calculated charge is a×b dollars.

The jurisdiction management server 40 creates an accounting notice window for each printing device in the block (step S214), and delivers the created accounting notice window to the corresponding printing device for notification of accounting (step S216). The program then exits from this accounting routine. FIG. 6 shows one example of the accounting notice window. In the illustrated example of the accounting notice window, 'quantity' represents the compiled total consumption of each printing paper, 'unit price ($)' represents the unit cost set for each printing paper with the currency in circulation in the block, 'sub total ($)' represents the calculated charge for each printing paper with the currency in circulation in the block, and 'total amount ($)' represents the total amount of the calculated charges of the respective printing papers with the currency in circulation in the block.

In the printing management system 20 of the embodiment described above, based on the expendable consumption data of the respective printing devices 50a and 50b transmitted from the information management apparatus 30, the jurisdiction management server 40 manages supplies of expendables to the respective printing devices 50a and 50b, while calculating the charges to the respective printing devices 50a and 50b with the currency in circulation in the block. Even when the multiple printing devices 50a and 50b are located in a wide area of different languages or different currencies, this arrangement ensures effective management of printing and supplies of expendables and attains adequate accounting to the multiple printing devices 50a and 50b. The expendable consumption data of all the printing devices 50a and 50b are stored in the expendable consumption database 32 of the information management apparatus 30. The information management apparatus 30 thus manages the consumptions of expendables consumed in the whole printing management system 20 and contributes to a production plan of the expendables.

In the printing management system 20 of the embodiment, the jurisdiction management server 40 carries out accounting to the printing devices 50a and 50b in the block, based on the expendable consumption data transmitted from the information management apparatus 30. In one possible modification, the information management apparatus 30 may carry out accounting to all the printing devices 50a and 50b in the printing management system 20 with the currency in circulation in each corresponding block to adjust account data and may transmit the adjusted account data to the corresponding jurisdiction management servers 40. Each of the jurisdiction management servers 40 receiving the account data may manage accounting to the printing devices 50a and 50b in the corresponding block. In this modified structure, the information management apparatus 30 executes an account data adjustment routine shown in the flowchart of FIG. 7. The jurisdiction management server 40 receives the account data adjusted according to the account data adjustment routine, creates an accounting notice window as shown in FIG. 6 based on the received account data, and delivers the created accounting notice window to each corresponding printing device 50a or 50b.

Figure 7:
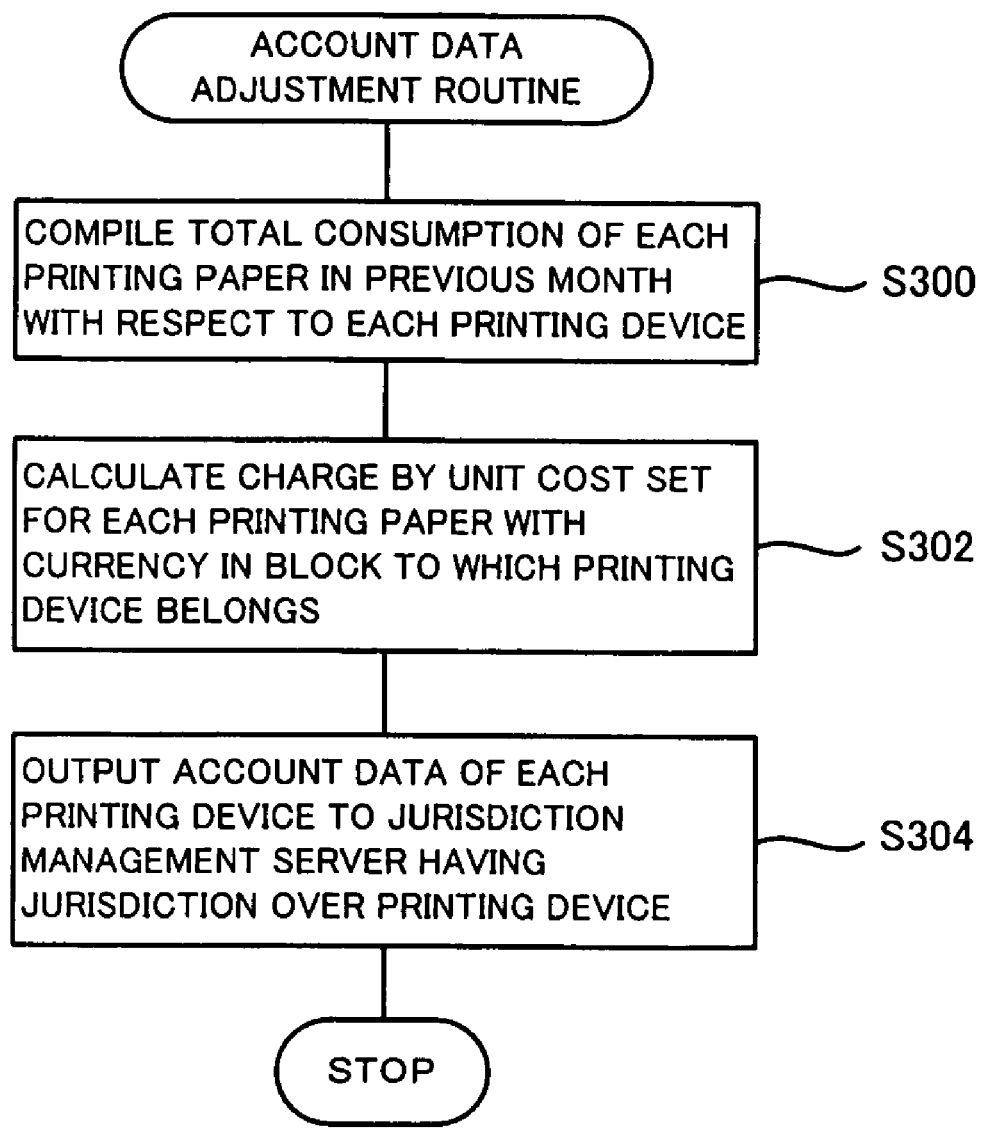
FIG. 7 is a flowchart showing an account data adjustment routine executed by the information management apparatus 30 included in a printing management system 20B of a modified example.

When the program enters the account data adjustment routine of FIG. 7, the information management apparatus 30 in a printing management system 20B of a modified example first searches the expendable consumption database 32 to compile the total consumption of each printing paper in a previous month with respect to each printing device (step S300). The information management apparatus 30 subsequently multiplies the compiled total consumption of each printing paper by a unit cost set for the printing paper with the currency in circulation in the block, to which the printing device belongs, so as to calculate a charge for the printing paper (step S302). The currency used for the calculation may be specified by the ID of the jurisdiction management server 40 that has jurisdiction over the printing device. The ID of the jurisdiction management server 40 is included in the expendable consumption data shown in FIG. 3. The calculation of the charge is identical with the calculation of the charge in the accounting routine of FIG. 5. The calculated charge and the compiled total consumption of each printing paper in the previous month with respect to each printing device are output as account data to the jurisdiction management server 40 that has jurisdiction over the corresponding printing device (step S304). The program then exits from the account data adjustment routine.

The jurisdiction management server 40 receives the account data transmitted from the information management apparatus 30 and carries out processing similar to the processing of steps S214 and S216 in the accounting routine of FIG. 5 to create an accounting notice window based on the account data and deliver the created accounting notice window to each corresponding printing device 50a or 50b.

Like the printing management system 20 of the embodiment, even when the multiple printing devices 50a and 50b are located in a wide area of different languages or different currencies, the arrangement of the printing management system 20B of the modified example ensures effective management of printing and supplies of expendables and attains adequate accounting to the multiple printing devices 50a and 50b. In the arrangement of this modified example, the information management apparatus 30 effectively manages the consumptions of expendables consumed in the whole printing management system 20. In the printing management system 20B of the modified example, the information management apparatus 30 further manages accounting to all the printing devices 50a and 50b in the printing management system 20.

In the printing management system 20B of the modified example, the information management apparatus 30 carries out accounting to all the printing devices 50a and 50b in the printing management system 20B with the currency in circulation in each corresponding block to adjust account data and transmits the adjusted account data to the corresponding jurisdiction management servers 40. The jurisdiction management server 40 receives the transmitted account data and manages accounting to the printing devices 50a and 50b in the corresponding block. In one possible modification, the currency in circulation in each block may not be used for the accounting by the information management apparatus 30. In this case, the information management apparatus 30 carries out accounting with a preset unit (for example, a point) convertible into the currency in circulation in each block to adjust account data and transmits the adjusted account data to the jurisdiction management server 40. The jurisdiction management server 40 converts the preset unit of the received account data into the currency in circulation in the block, creates an accounting notice window, and delivers the created accounting notice window to each corresponding printing device.

In the printing management system 20B of the modified example, the information management apparatus 30 carries out accounting to all the printing devices 50a and 50b in the printing management system 20B with the currency in circulation in each corresponding block to adjust account data and transmits the adjusted account data to the corresponding jurisdiction management server 40. The jurisdiction management server 40 receives the transmitted account data and manages accounting to the printing devices 50a and 50b in the corresponding block. In another possible modification, the information management apparatus 30 may compile the total consumption of each printing paper in a previous month with respect to each of ail the printing devices 50a and 50b in the printing management system 20B and transmit the compiled total consumption of each printing paper as compiled account data to the corresponding jurisdiction management server 40. The jurisdiction management server 40 receives the compiled account data, multiplies the compiled consumption of each printing paper with respect to each printing device by the unit cost set with the currency in circulation in the corresponding block to calculate a charge for the printing paper, creates an accounting notice window based on the calculation results, and deliver the created accounting notice window to the corresponding printing device.

In the printing management system 20 of the embodiment or in the printing management system 20B of the modified example, the printing devices in the system are divided into blocks according to the language, the geography, and the currency. The jurisdiction management server 40 having jurisdiction over each block manages the supplies of expendables and accounting. Division into the blocks may be set according to any arbitrary factor. For example, division into the blocks may not depend upon the language or the currency but be based on only the geographical factor, may not depend upon the currency or the geography but be based on only the language factor, or may not depend upon the language or the geography but be based on only the currency factor.

The printing management system 20 of the embodiment and the printing management system 20B of the modified example carry out the accounting at the frequency of once a month. This is, however, not restrictive, and the frequency of accounting may be set arbitrarily, for example, once a week.

In the printing management system 20 of the embodiment or in the printing management system 20B of the modified example, the supply instruction of the expendables is output from the jurisdiction management server 40 to the computer 42 of the expendable supplier. In one modified structure, the supply instruction of the expendables may be output to a display device or a printing device connecting with the jurisdiction management server 40, and an organization or a corporation managing the jurisdiction management server 40 may take charge of supplying the expendables to the printing devices 50a and 50b.

The embodiment discussed above is to be considered in all aspects as illustrative and not restrictive. There may be many modifications, changes, and alterations without departing from the scope or spirit of the main characteristics of the present invention.

What is claimed is:

1. A printing management system comprising multiple printing devices divided into plural groups, plural group management apparatuses, each of which is provided in each of the plural groups and is connected with plural printing devices belonging to the group via a communication line, and an information management apparatus that is connected via the communication line with said multiple printing devices and with said plural group management apparatuses, each of said multiple printing devices comprising: an information storage module that stores printing device identification information for identifying said printing device, group identification information for identifying a group to which said printing device belongs, and expendable consumption information regarding an expendable consumed by said printing device; and an information transmission module that reads the printing device identification information, the group identification information, and the expendable consumption information from said information storage module at a preset timing and transmits the read-out printing device identification information, group identification information, and expendable consumption information to said information management apparatus via the communication line, said information management apparatus comprising: an information management apparatus storage module that stores information; an information management apparatus receiver-transmitter module that receives and transmits information via the communication line; an information reception and storage control module that controls said information management apparatus receiver-transmitter module to receive the printing device identification information, the group identification information, and the expendable consumption information transmitted from said information transmission module of each printing device and stores the received printing device identification information, group identification information, and expendable consumption information correlated with one another into said information management apparatus storage module; and an information transmission control module that controls said information management apparatus receiver-transmitter module to transmit the printing device identification information, the group identification information, and the expendable consumption information correlated with one another and stored into said information management apparatus storage module to each group management apparatus identified by the group identification information, each of said group management apparatuses comprising: a group management apparatus storage module that stores information; a group management apparatus receiver-transmitter module that receives and transmits information via the communication line; an information reception and storage control module that controls said group management apparatus receiver-transmitter module to receive the printing device identification information, the group identification information, and the expendable consumption information transmitted from said information management apparatus receiver-transmitter module and stores the received printing device identification information, group identification information, and expendable consumption information correlated with one another into said group management apparatus storage module; an expendable supplementary quantity setting module that reads the printing device identification information and the expendable consumption information from said group management apparatus storage module and sets a supplementary quantity of the expendable to be supplied to each printing device identified by the printing device identification information based on the read-out expendable consumption information; and an accounting management module that reads the printing device identification information and the expendable consumption information from said group management apparatus storage module, carries out accounting based on the read-out expendable consumption information, and sets a charge to said printing device identified by the printing device identification information.

* * * * *